US011599427B2

(12) United States Patent
Clark et al.

(10) Patent No.: US 11,599,427 B2
(45) Date of Patent: Mar. 7, 2023

(54) DISTRIBUTED RECOVERY OF SERVER INFORMATION

(71) Applicant: HITACHI VANTARA LLC, Santa Clara, CA (US)

(72) Inventors: Ngale Clark, Millbury, MA (US); Christopher Miller, Waltham, MA (US); Scott Yaninas, Boston, MA (US); Jeffrey Gross, Franklin, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 175 days.

(21) Appl. No.: 17/057,122

(22) PCT Filed: Aug. 2, 2018

(86) PCT No.: PCT/US2018/044945
§ 371 (c)(1),
(2) Date: Nov. 20, 2020

(87) PCT Pub. No.: WO2020/027840
PCT Pub. Date: Feb. 6, 2020

(65) Prior Publication Data
US 2021/0200648 A1    Jul. 1, 2021

(51) Int. Cl.
*G06F 11/14* (2006.01)
*G06F 16/182* (2019.01)
(Continued)

(52) U.S. Cl.
CPC ........ *G06F 11/1469* (2013.01); *G06F 16/178* (2019.01); *G06F 16/183* (2019.01); *H04L 67/10* (2013.01); *G06F 2201/84* (2013.01)

(58) Field of Classification Search
CPC .. G06F 11/1469; G06F 16/183; G06F 16/178; G06F 2201/84; H04L 67/10
See application file for complete search history.

(56) References Cited

U.S. PATENT DOCUMENTS 6,785,786 B1 * 8/2004 Gold ................... G06F 11/1469
714/E11.122
7,483,923 B2 * 1/2009 Novik ................... G06F 16/178
(Continued)

OTHER PUBLICATIONS

International Search Report and Written Opinion of PCT/US2018/044945 dated Oct. 16, 2018.
(Continued)

*Primary Examiner* — Alford W Kindred
*Assistant Examiner* — Tiffany Thuy Bui
(74) *Attorney, Agent, or Firm* — Mattingly & Malur, PC

(57) ABSTRACT

In some examples, a first computing device may receive, from a server, an indication that the server has recovered data. For instance, the first computing device may store metadata including a mapping for one or more file systems accessed by one or more client devices. Furthermore, a second computing device may store a copy of the mapping stored on the first computing device. The first computing device may receive, from the server, a mapping of the one or more file systems determined by the server based on the recovered data. The first computing device may compare the mapping from the server with the mapping of the one or more file systems on the first computing device, and may send, to the server, information about changes determined between the two mappings to enable the server to update the mapping on the server based on the changes.

19 Claims, 10 Drawing Sheets

(51) Int. Cl.
*G06F 16/178* (2019.01)
*H04L 67/10* (2022.01)

(56) References Cited

U.S. PATENT DOCUMENTS

| | | | |
|---|---|---|---|
| 7,650,341 | B1 | 1/2010 | Oratovsky et al. |
| 9,672,117 | B1 * | 6/2017 | Natanzon ............ G06F 11/1464 |
| 10,474,534 | B1 * | 11/2019 | Rangapuram ....... G06F 11/1451 |
| 2006/0179037 | A1 | 8/2006 | Turner et al. |
| 2010/0114847 | A1 | 5/2010 | Giampaolo et al. |
| 2010/0293147 | A1 * | 11/2010 | Snow ...................... G06F 16/10 707/E17.007 |
| 2011/0083036 | A1 | 4/2011 | Pawlowski et al. |
| 2011/0225141 | A1 | 9/2011 | Chaudhry et al. |
| 2012/0096312 | A1 | 4/2012 | Turner et al. |
| 2013/0013654 | A1 | 1/2013 | Lacapra et al. |
| 2015/0127982 | A1 | 5/2015 | Tung et al. |
| 2015/0269032 | A1 * | 9/2015 | Muthyala ................ G06F 3/065 707/649 |
| 2016/0210204 | A1 | 7/2016 | Clark et al. |
| 2018/0137187 | A1 * | 5/2018 | Brodt .................... G06F 16/275 |
| 2018/0157561 | A1 * | 6/2018 | Venkatesh ................ G06F 8/63 |
| 2020/0401487 | A1 * | 12/2020 | Ghodake ............. G06F 11/1469 |

OTHER PUBLICATIONS

Harcharan Jit Singh, et al., "Scalable Metadata Management Techniques for Ultra-Large Distributed Storage Systems—A Systematic Review", ACM Computing Surveys, Jul. 2018, vol. 51, No. 4, Article 82.

European Search Report for 18928879.8 dated Feb. 8, 2022.

* cited by examiner

DISTRIBUTED RECOVERY OF SERVER INFORMATION

TECHNICAL FIELD

This disclosure relates to the technical field of recovery of data, such as on a server.

BACKGROUND

With the growth of unstructured non-mutable digital content, it can be challenging to manage and backup data in a distributed client-server system. For example data from the servers in a computer system may be periodically or continually backed up to another system. However, performing continual data backups can place a strain on networks and connected computing devices due to the constant communications between the devices for backing up each action performed in the system. On the other hand, periodic data backups may provide for minimal impact to system performance, as compared to continual data backups, but create the potential for data loss. For example, when data backups are performed periodically, any data added to the system since the last backup may become unrecoverable after a failure of a server, storage, or the like.

SUMMARY

Some implementations include at least a first computing device, a second computing device, and a server. For example, the first computing device may receive, from the server, an indication that the server has recovered data. For instance, the first computing device may store metadata including a mapping for one or more file systems accessed by one or more client devices. For example, a file system mapping may be a path listing of all the directories, subdirectories, folders, and files in each file system having a separate file system identifier (ID), and may include a mount point, or the like, for the file system. As one example, a mount point may be a directory in a first file system where another file system is attached.

Furthermore, the second computing device may be configured to store a copy of the file system mapping stored on the first computing device. The first computing device may receive, from the server, a mapping of the one or more file systems determined by the server based on the recovered data. The first computing device may compare the mapping from the server with the mapping of the one or more file systems on the first computing device. In addition, the first computing device may send, to the server, information about changes determined to have occurred (i.e., differences) between the mapping stored on the first computing device and the mapping received from the server to enable the server to update the mapping on the server based on the changes. In some examples, data updates to the file systems may be performed following completion of the synchronization of the file system mapping between the server and the service computing device(s).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Figure 1:
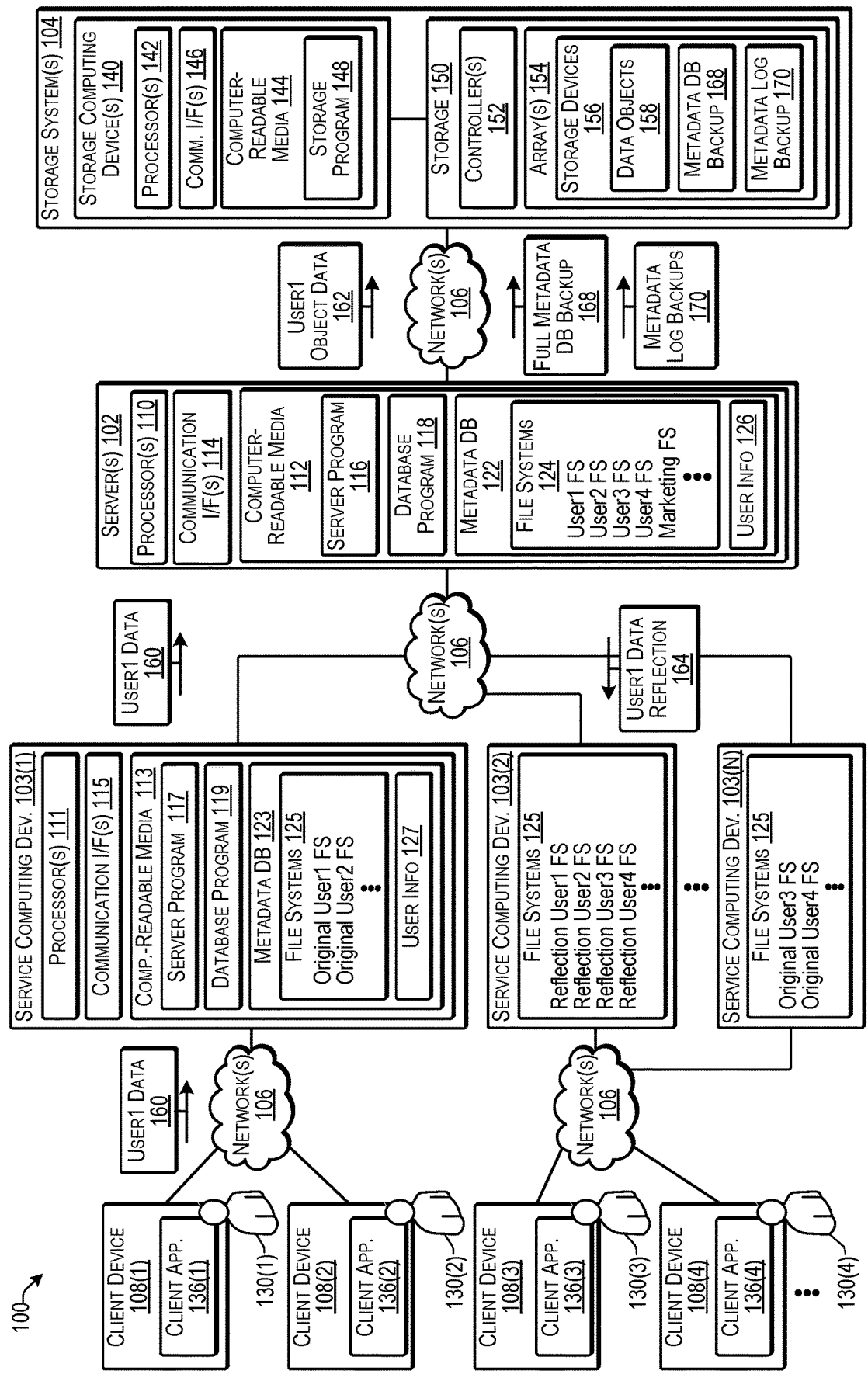
FIG. 1 illustrates an example architecture of a system configured for performing recovery of a server according to some implementations.

Some implementations herein are directed to techniques and arrangements for a distributed computer system including a robust disaster recovery capability for minimizing data loss in the case of a system failure. For example, if a server fails, such as due to disaster, faults or accidents on the server, sabotage, hacking, or other cause of failure, then the server may subsequent execute a recovery process to perform server recovery. This process may include utilizing data backups and log backups stored in a storage system to recover data and to thereby restore the server to a previous backup point. When the server has reached that point as a first recovery point, the server may next execute an additional recovery process by causing one or more service computing devices to determine differences, i.e., changes that have occurred, between their data and the data on the server, and provide information about the changes to the server so that the server can continue recovery. For instance, the service computing devices may provide one or more services to a plurality of client computing devices, such as for storing, managing, and retrieving data for the client computing devices. Thus, the server may interact with a plurality of the service computing devices, each of which may have a portion of the data to be recovered by the server.

As one example, a service computing device serving in an original role (as opposed to a mirror role) may receive, from the server, a mapping of the one or more file systems determined by the server based on the recovered data. The service computing device may compare the mapping from the server with the mapping of the one or more file systems on the service computing device, and may send, to the server, information about any changes determined to have occurred in the (i.e., differences between) the mapping stored on the first computing device and the mapping received from the server to enable the server to update the mapping on the server based on the determined changes. If there are multiple service computing devices serving in an original role, the server may synchronize mapping information with each of these service computing devices. After synchronization of the mapping information on the service computing device(s) with the recovered data on the server, the recovery may be complete. The server may subsequently communicate with one or more additional service computing devices that serve mirroring roles for synchronizing any mapping updates with those service computing devices.

Following completion of the synchronization of the file system mapping between the server and the service computing devices, the server may communicate with the service computing devices to perform any data updates to the file system that may have occurred on the service computing device and that have not yet been processed by the server. For example, the service computing devices may synchronize files with the server by sending new file contents, updates, changes, etc., to the server. The server may update its own file system metadata based on the data updates and may interact with the storage system as necessary for storing or retrieving file content. In some cases, the service computing devices may ignore any requests from the server for file data updates until the mapping synchronization is complete.

For discussion purposes, some example implementations are described in the environment of a server in communication with a storage system and a plurality of service computing devices that interact with a plurality of client devices for managing storage of files, folders, objects, and/or other data and associated metadata. However, implementations herein are not limited to the particular examples provided, and may be extended to other types of computing system architectures, other types of storage environments, other types of client configurations, other types of data, and so forth, as will be apparent to those of skill in the art in light of the disclosure herein.

FIG. 1 illustrates an example architecture of a system 100 configured for performing recovery of a server 102 according to some implementations. The system 100 includes a least one of the servers 102 that is able to communicate with, or is otherwise coupled to, at least one storage system(s) 104, such as through one or more networks 106. Further, the server 102 may be able to communicate over one or more networks 106 with a plurality of service computing devices 103, such as service computing devices 103(1), 103(2), . . . , 103(N), that are able to communicate over the network(s) 106 with one or more client computing devices 108, such as client devices 108(1), 108(2), 108(3), 108(4), . . . , which may be any of various types of computing devices, as discussed additionally below.

In some examples, the server(s) 102 may include one or more servers that may be embodied in any number of ways. For instance, the programs, other functional components, and at least a portion of data storage of the server(s) 102 may be implemented on at least one server, such as in a cluster of servers, a server farm, a data center, a cloud-hosted computing service, and so forth, although other computer architectures may additionally or alternatively be used. In the illustrated example, the server(s) 102 includes, or may have associated therewith, one or more processors 110, one or more computer-readable media 112, and one or more communication interfaces 114.

Each processor 110 may be a single processing unit or a number of processing units, and may include single or multiple computing units, or multiple processing cores. The processor(s) 110 can be implemented as one or more central processing units, microprocessors, microcomputers, microcontrollers, digital signal processors, state machines, logic circuitries, and/or any devices that manipulate signals based on operational instructions. As one example, the processor(s) 110 may include one or more hardware processors and/or logic circuits of any suitable type specifically programmed or configured to execute the algorithms and processes described herein. The processor(s) 110 may be configured to fetch and execute computer-readable instructions stored in the computer-readable media 112, which may program the processor(s) 110 to perform the functions described herein.

The computer-readable media 112 may include volatile and nonvolatile memory and/or removable and non-removable media implemented in any type of technology for storage of information, such as computer-readable instructions, data structures, program modules, or other data. For example, the computer-readable media 112 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server 102, the computer-readable media 112 may be a tangible non-transitory medium to the extent that, when mentioned, non-transitory computer-readable media exclude media such as energy, carrier signals, electromagnetic waves, and/or signals per se. In some cases, the computer-readable media 112 may be at the same location as the server 102, while in other examples, the computer-readable media 112 may be partially remote from the server 102. For instance, in some cases, the computer-readable media 112 may include a portion of storage in the storage system(s) 104.

The computer-readable media 112 may be used to store any number of functional components that are executable by the processor(s) 110. In many implementations, these functional components comprise instructions or programs that are executable by the processor(s) 110 and that, when executed, specifically program the processor(s) 110 to perform the actions attributed herein to the server 102. Functional components stored in the computer-readable media 112 may include a server program 116 and a database program 118, each of which may include one or more computer programs, applications, executable code, or portions thereof. For example, the server program 116 may provide communication functionality with the service computing devices 103 and thus, the client devices 108, and the storage system(s) 104. The database program 118 may include a database management function for creating and managing a metadata database 122 containing metadata, such as one or more file systems 124 or the like, corresponding to data stored at the storage system(s) 104. For example, the database program 118 may include executable instructions configured to cause the database program 118 to maintain the file systems 124 and associated information as part of the metadata database 122 as well as perform the other functions described herein attributed to the server 102 for creation and management of folders and associated file systems, as well as for performing recovery functions according to the algorithms and techniques described herein, such as following a disaster, malfunction, maintenance, or other failure of the server 102. The database program 118 may further perform a folder management function, such as for creating and managing private folder information, shared folder information, and team folder information (not shown in FIG. 1). The database program 118 may further perform a management function for managing other types of information included in the metadata database 122, such as user information 126. Additional functional components stored in the computer-readable media 112 may include an operating system (not shown in FIG. 1) for controlling and managing various functions of the server(s) 102. In some cases, the functional components may be stored in a storage portion of the computer-readable media 112, loaded into a local memory portion of the computer-readable media 112, and executed by the one or more processors 110.

In addition, the computer-readable media 112 may store data and data structures used for performing the functions and services described herein. For example, the computer-readable media 112 may store the metadata database 122. In the illustrated example, the metadata database 122 includes a plurality of file systems 124, such as for individual users, as well as for groups of users and teams of users. In some cases, individual file systems 124 may each correspond to one or more folders, such as private folders which may correspond to individual users, shared folders which may correspond to two or more users who share a folder, or team folders, which may correspond to sub-organizations within an organization, such as marketing, engineering, human resources, etc.

In some examples, a private folder may correspond to a particular user's private file system. Only the user that owns the private folder may access that private folder. Users may also share folders that they own with other users as shared folders. Shared folders may each be independent file systems. Furthermore, a team folder may be a folder that is not owned by any user but which may be accessed and managed by one or more users belonging to that team. The team folder may exist in its own file system. In addition, the metadata database 122 may include other information that may be included in the file systems 124, or portions of which may be stored separately from the file systems 124.

Further, the user information 126 may include information about respective users 130, such as user permissions for folders/file systems, user account information, user login information and user credentials, and so forth. The server 102 may also include or maintain other functional components and data, which may include programs, drivers, etc., and the data used or generated by the functional components. Further, the server 102 may include many other logical, programmatic, and physical components, of which those described above are merely examples that are related to the discussion herein.

The one or more communication interfaces (I/Fs) 114 may include one or more software and hardware components for enabling communication with various other devices, such as over the one or more network(s) 106. Thus, the communication interfaces 114 may include, or may couple to, one or more ports that provide connection to the network(s) 106 for communicating with the storage system(s) 104, and one or more ports that provide connection to the network(s) 106 for communication with other computing devices, such as the service computing devices 103. For example, the communication interface(s) 114 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The one or more networks 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the server 102 and client devices 108 are able to communicate over the one or more networks 106 using wired or wireless connections, and combinations thereof. Further, in some cases, a load balancing computing device (not shown in FIG. 1) may be located between the server 102 and the client devices 108. Additionally, in some examples, the network(s) 106 may include a LAN and the server 102 and the storage system(s) 104 may be located locally to each other.

The service computing devices 103 may have a hardware configuration similar to that of the server(s) 102, and may include one or more processors 111, one or more computer-readable media 113, and one or more communication interfaces 115. For example, the processors 111 may correspond to any of the examples discussed above with respect to the processors 110, the computer-readable media 113 may correspond to any of the examples discussed above with respect to the computer-readable media 112, and the communication interfaces 115 may correspond to any of the examples discussed above with respect to the communication interfaces 114.

The computer-readable media 113 may be used to store any number of functional components that are executable by the processor(s) 111. In many implementations, these functional components comprise instructions or programs that are executable by the processor(s) 111 and that, when executed, specifically program the processor(s) 111 to perform the actions attributed herein to the service computing devices 103. Functional components stored in the computer-readable media 113 may include a server program 117 and a database program 119, each of which may include one or more computer programs, applications, executable code, or portions thereof. For example, the server program 117 may provide communication functionality with the client devices 108 and the server(s) 102.

The database program 119 may include a database management function for creating and managing a metadata database 123 containing metadata, such as one or more file systems 125, or the like, corresponding to data stored at the storage system(s) 104. For example, the database program 119 may include executable instructions configured to cause the database program 119 to maintain the file systems 125 and associated information as part of the metadata database 123 as well as perform the other functions described herein attributed to the service computing device(s) 103 for creation and management of folders and associated file systems, and for performing recovery operations for assisting in recovery of the server(s) 102 according to the algorithms and techniques described herein. The database program 119 may further perform a folder management function as well as for functions for managing other types of information included in the metadata database 123, such as user information 127. Additional functional components stored in the computer-readable media 113 may include an operating system (not shown in FIG. 1) for controlling and managing various functions of the service computing device(s) 103. In some cases, the functional components may be stored in a storage portion of the computer-readable media 113, loaded into a local memory portion of the computer-readable media 113, and executed by the one or more processors 111.

In addition, the computer-readable media 113 may store data and data structures used for performing the functions and services described herein. For example, the computer-readable media 113 may store the metadata database 123. In the illustrated example, the metadata database 123 includes a plurality of file systems 125, such as for individual users, as well as for groups of users and teams of users, which may correspond to a portion of the file systems 124 maintained by the server(s) 102. In some cases, individual file systems 125 may each correspond to one or more folders, such as private folders which may correspond to individual users, shared folders which may correspond to two or more users who share a folder, or team folders, which may correspond to sub-organizations within an organization, such as marketing, engineering, human resources, etc.

Further, the user information 127 may include information about respective users 130, such as permissions for folders/file systems, user account information, user login information and user credentials, and so forth. For example, the client devices 108(1) and 108(2) of the users 130(1) and 130(2), respectively, may be configured to communicate with the first service computing device 103(1), while the client devices 108(3) and 108(4) of the users 130(3) and 130(4), respectively, may be configured to communicate with the Nth service computing device 103(N). As such, the respective service computing devices 103 may server as local storage for the users 130. The service computing devices 103 may also include or maintain other functional components and data, which may include programs, drivers, etc., and the data used or generated by the functional components. Further, the service computing devices 103 may include many other logical, programmatic, and physical components, of which those described above are merely examples that are related to the discussion herein. Additionally, while the components 111, 113, 115, 117, 119, and 123, are not illustrated in the service computing devices 103(2) . . . 103(N) in FIG. 1 for clarity of illustration, the service computing devices 103(2) . . . 103(N) may include components that are the same or similar to the components 111, 113, 115, 117, 119, and 123 discussed above with respect to the service computing device 103(1).

Each client device 108 may be any suitable type of computing device such as a desktop, laptop, tablet computing device, mobile device, smart phone, wearable device, and/or any other type of computing device able to send data over a network. In some cases, the client devices 108 may include a hardware configuration and logical configuration as discussed below with respect to FIG. 10. The users 130(1), 130(2), 130(3), 130(4), . . . , may be associated with client devices 108(1), 108(2), 108(3), 108(4), . . . , respectively, such as through a respective user account, user login credentials, or the like. Furthermore, the client devices 108 may be able to communicate with the service computing device(s) 103 through the one or more networks 106, through separate networks, or through any other suitable type of communication connection. Numerous other variations will be apparent to those of skill in the art having the benefit of the disclosure herein.

Further, each client device 108(1)-108(4) may include a respective instance of a client application 136(1)-136(4) that may execute on the respective client device 108(1)-108(4), such as for communicating with the server program 117, e.g., for sending user data for storage on the storage system(s) 104 and/or for receiving stored data from the storage system(s) 104. As another example, the application 136 may be used by the user 130 for generating and sending a folder request for creation of a folder to the service computing device 103. In some cases, the application 136 may include a browser or may operate through a browser, while in other cases, the application 136 may include any other type of application having communication functionality enabling communication with the server program 117 over the one or more networks 106. In some examples, individual users 130 may have multiple client devices 108, and the service computing device(s) 103 may automatically synchronize a particular user's data to each of the client devices 108 with which the particular user 130 is associated.

The storage system(s) 104 may include one or more storage computing devices 140, which may include one or more servers or any other suitable computing device, such as any of the examples discussed above with respect to the server 102. The storage computing device(s) 140 may each include one or more processors 142, one or more computer-readable media 144, and one or more communication interfaces 146. For example, the processors 142 may correspond to any of the examples discussed above with respect to the processors 110, the computer-readable media 144 may correspond to any of the examples discussed above with respect to the computer-readable media 112, and the communication interfaces 146 may correspond to any of the examples discussed above with respect to the communication interfaces 114.

In addition, the computer-readable media 144 may include a storage program 148 as a functional component executed by the one or more processors 142 for managing the storage of data on a storage 150 included in the storage system(s) 104. The storage 150 may include one or more controllers 152 associated with the storage 150 for storing data on one or more arrays 154 of storage devices 156, or the like. For instance, the controller 152 may control the arrays 154, such as for configuring the arrays 154 in a RAID configuration, JBOD configuration, or the like, and/or for presenting logical units based on the storage devices 156 to the storage program 148, and for managing data, such as data objects 158, stored on the underlying physical storage devices 156. The storage devices 156 may be any type of storage device, such as hard disk drives, solid state drives, optical drives, magnetic tape, combinations thereof, and so forth. In some examples, the one or more arrays 154 may include a thin-provisioning array configured to provide on-demand storage capacity. Further, the storage 150 may be used to create a storage pool to be used to provide storage capacity for various users, groups of users, teams, etc.

In the system 100, the users 130 may store data to, and receive data from, the service computing device(s) 103 that their respective client devices 108 are in communication with. Accordingly, the service computing devices 103 may provide local storage for the users 130 and respective client devices 108. During steady state operation there may be clients 108 periodically communicating with the service computing devices 103. The clients 108 synchronize files with the service computing devices 103 by sending new file contents to a respective service computing device 103 and receiving updated files from the respective service computing device 103. In some examples, all clients for a given user may synchronize the same set of files. Furthermore, the service computing devices 103 synchronize files with the server 102, such as by sending received file content to the server 102 and by receiving files from the server 102 for delivery to the clients 108.

As an example, suppose that the user 130(1) stores user1 data 160 to a designated folder managed by the service computing device 103(1), which may correspond to at least a portion of a file system 125 and 124. As a non-limiting example, suppose that the user1 data 160 includes object data, such as an image, a word processing document, a spreadsheet, or so forth. The service computing device 103(1) may receive the user1 data 160 and may store metadata about the user1 data in the file system of the user 130(1). In the illustrated configuration, certain ones of the service computing device(s) 103 are designated to operate in an "original" role in which the service computing device(s) 103 communicate directly with certain client devices 108 for performing data storage and serving operations. For instance, suppose that service computing devices 103(1) and 103(N) are configured to operate in original roles in the illustrated example. Others of the service computing device(s) 103 may be configured to operate in a reflection (mirror) role in which file system metadata stored by the one or more of the original service computing devices 103 is mirrored or otherwise stored as a copy on the reflection service computing device(s) 103. Thus, the reflection service computing device(s) 103 may serve as a backup for the original service computing devices. In the illustrated example, service computing device 103(2) is operating in a reflection role and may contain file system metadata corresponding to file system metadata contained in the original service computing device(s), i.e., service computing devices 103(1) and 103(N) in this example.

When the service computing device 103(1) receives the user1 data 160, the database program 119 may store information about the data and may determine a path for the data in the original user1 file system (FS) managed by the database program 119. In addition, the server program 117 on the service computing device 103 may forward the user1 data 160 to the server(s) 102. The database program 118 on the server(s) 102 may store metadata about the user1 data 160 in the metadata database 122, such as with respect to the user1 file system managed by the database program 118. In addition, the server program 116 on the server 102 may forward at least the object portion of the user1 data 160 to the storage system 104 as user1 object data 162. The storage system 104 may store the user1 object data 162 in object storage with other data objects 158. Retrieval of an object from the storage system 104 by the client device 108 may be similarly achieved in reverse.

Furthermore, a user1 data reflection 164 may also be stored to the reflection service computing device 103(2). For example, depending on the system configuration, either the service computing device 103(1) or the server 102 may send the user1 data reflection 164 to the reflection role service computing device 103, which may include solely metadata, i.e., changes to the user1 FS made on the first service computing device 103(1) as a result of receiving the user1 data 160. Thus, the object data typically might not be sent to the reflection service computing device 103(2). Receipt of the user1 data reflection 164 by the service computing device 103(2) may cause the database program (not shown in FIG. 1) on the service computing device 103(2) to update the reflection user1 FS on the service computing device 103(2) based on the information included in the user1 data reflection 164.

As mentioned above, server(s) 102 herein may include a robust disaster recovery function able to minimize data loss in the case of system failures. As an initial safeguard, the server(s) 102 may periodically backup the metadata database 122 to the storage systems 104. For example, on a periodic basis, such as once a week, once a day, once every two days, once every three days, once a month, or any other suitable time period, the database program 118 may send a full metadata database backup 168 to the storage system 104 for storage. In addition, the database program 118 may periodically send metadata log backups 170, such as every hour, every half hour, every two hours, or the like. Alternatively, the metadata log backups 170 may be sent when they reach a predetermined threshold size such as 16 MB, 32 MB, 8 MB, and so forth. Accordingly, in this case, the frequency with which the metadata log backups 170 are sent is dependent at least in part on how heavily the system 100 is used.

The metadata log backups 170 may be used in addition to the full metadata database backups 168 for restoring the metadata database 122 to the server 102 in the case of a loss of data, such as for performing data restoration in disaster recovery situations. However, the periodic backups of the entire metadata database 122 and the backups of the metadata logs recorded between the periodic backups of the entire metadata data base 122 may create the potential for data loss. For example, data changed or added to the system by a client 108 since the last metadata log backup 170 is not included in the recovered metadata database 122 on the server 102. Consequently, the server 102 may communicate with the service computing devices 103 for restoring the missing data to the recovered metadata database 122.

For example, as discussed additionally below, following restore of the latest full metadata backup and the periodic metadata log backup from the storage system, the server 102 may first synchronize metadata with the service computing devices 103(1) and 103(N) operating in the original mode role. Subsequently, the server 102 if something should happen to one of the original devices, the server 102 may also synchronize metadata with the service computing device 103(2) and any other service computing devices 103 operating in the reflection role to ensure that all data has been recovered. If there is a conflict between the data on an original role computing device and the data on a reflection role computing device, the original role computing device may be treated as authoritative. Following completion of the synchronization with the original service computing device(s) 103, the server 102 may exit recovery mode and may begin operating in normal operation mode once again. Additional details of the synchronization of the metadata database 122 of the server 102 with the service computing devices 103 are described below.

Figure 2:
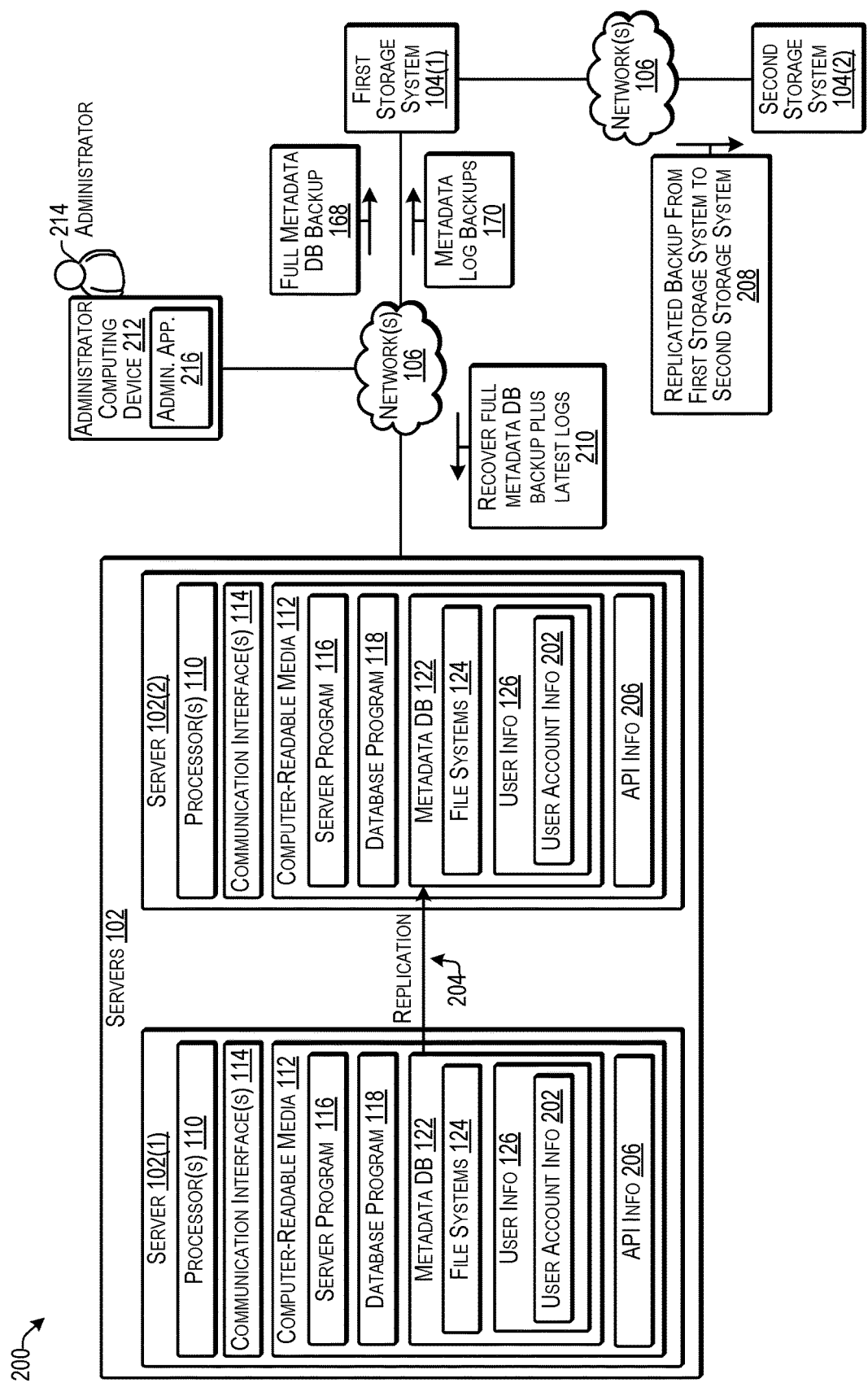
FIG. 2 illustrates one possible example configuration of the servers and the storage systems according to some implementations.

FIG. 2 illustrates one possible example configuration 200 of the servers 102 and the storage systems 104 according to some implementations. In the example configuration 200, a first server 102(1) may be coupled to a second server 102(2). For example, the first server 102(1) and second server 102(2) may together form a computing pod for providing storage and data management services to a plurality of the service computing devices 103 and client devices 108 (not shown in FIG. 2). In some examples, the first server 102(1) may act as a master or primary computing device, while the second server 102(2) may act as a slave or secondary computing device, at least with respect to maintaining the metadata database 122. For instance, the database program 118 on the first server 102(1) may update and maintain the metadata database 122 on the first server 102(1). For example, the database program 118 on the first server 102(1)

may manage the file systems 124, any associated folder information, and user information 126, including user account information 202.

As indicated at 204, the database program 118, or other program on the first server 102(1) may replicate the metadata database 122 to the second server 102(2). Accordingly, the second server 102(2) may maintain a replica of the metadata database 122, which may include a replica of the file systems 124 and user information 126. Should the first server 102(1) suffer a failure, the second server 102(2) may assume the role of primary computing device while the first server 102(1) is replaced with a different server (not shown in FIG. 2) and/or repaired. During this time, the second server 102(2) may maintain and update the metadata database 122, and interact with the client devices 108 and storage system(s) 104. Accordingly, should disaster strike only one of the servers 102, the other can continue to operate, typically without data loss.

In addition, this example shows that the servers 102 may include application programming interface (API) information 206. For example, the computing devices herein may use an API for communication of information between the computing devices such as between the service 102, the service computing devices 103, the client devices 108, and the storage systems 104. One example of a suitable API is a representational state transfer (REST) API, although implementations herein are not limited to any particular API.

Furthermore, the configuration 200 includes a first storage system 104(1) and a second the storage system 104(2) that may be in communication with each other over the one or more networks 106. In this example, the first storage system 104 may send a replicated backup 208 from the first storage system to the second storage system. Accordingly, the second storage system 104 also may include copies of the full metadata database backup 168 and the metadata log backups 170. Accordingly, following a catastrophic failure of both servers 102(1) and 102(2), the servers 102(1) and 102(2) may recover lost data using the full metadata database backup plus the latest logs as indicated at 210.

In addition, the system 100 may include, or may be able to communicate with, an administrator computing device 212 associated with an administrator 214 such as through the one or more networks 106. For example, the administrator computing device 212 may include an administrator application 216 that provides the administrator 214 with information about the server(s) 102 and the storage system(s) 104, and that provides one or more user interfaces to enable the administrator 214 to manage settings in the system, such as how frequently the full metadata database backup 168 and the metadata log backups 170 are performed, and the like. Furthermore, the example of FIG. 2 is just one example of a possible configuration of the one or more servers 102 and the one or more storage systems 104. Numerous other configurations will be apparent to those of skill in the art having the benefit of the disclosure herein.

Figure 3:
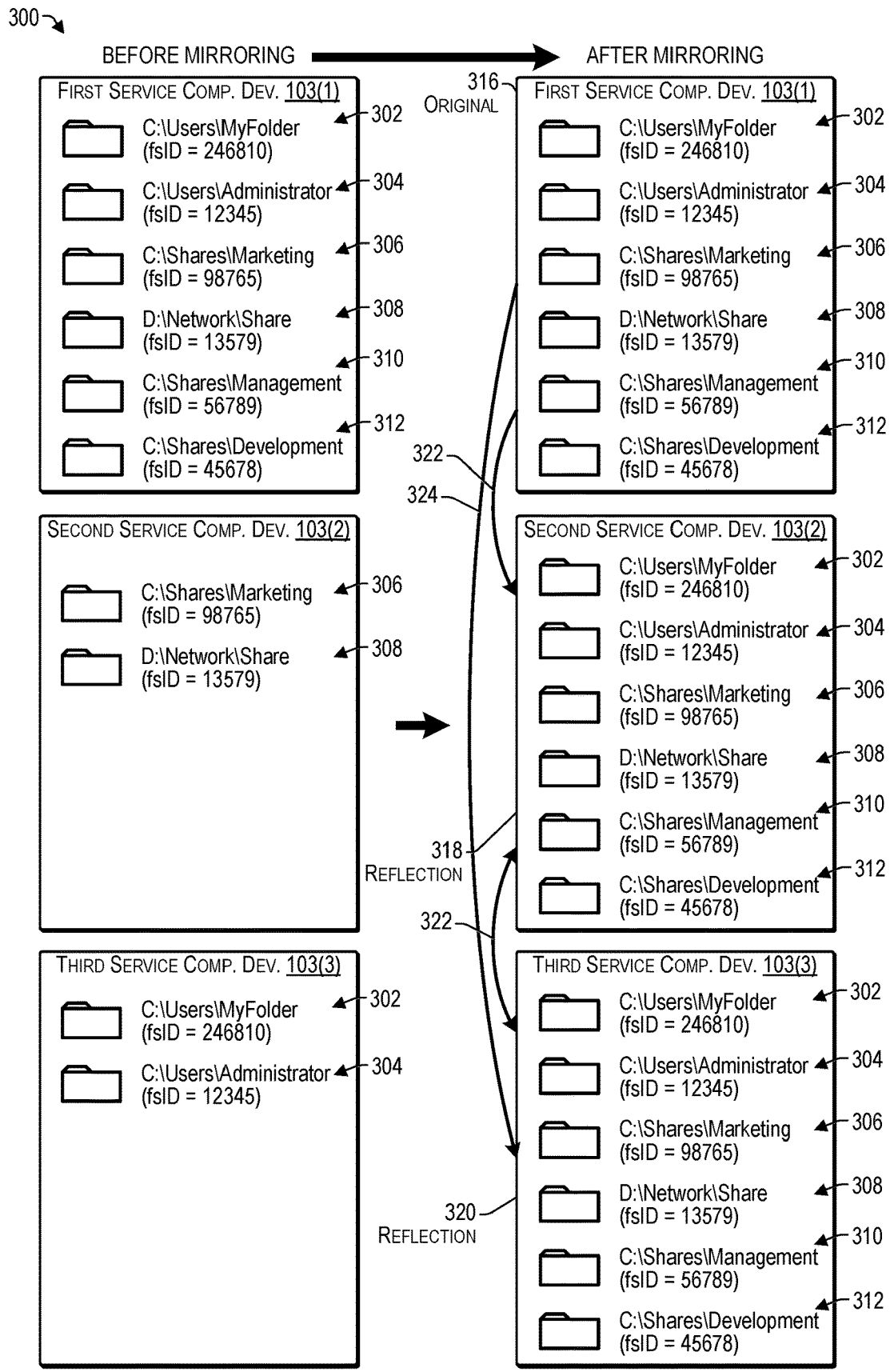
FIG. 3 is a block diagram illustrating an example configuration of three service computing devices before and after mirroring is applied according to some implementations.

FIG. 3 is a block diagram illustrating an example configuration 300 of three service computing devices before and after mirroring is applied according to some implementations. In this example, the first service computing device 103(1) may be is selected by the server 102 to serve in the original role because the first service computing device 103(1) includes a superset of all the file systems that are in use among these three service computing devices 103. In some examples, if no service computing device 103 among the service computing devices to be included in a mirror set has a superset of all of the file systems, the service computing device 103 currently having a largest number of file systems may be selected by the server 102 to be the original device and any remaining file systems present on a device that is intended to be used as a reflection device and not already on the service computing device selected to be the original device may be migrated to the selected original service computing device. Any new file systems added to the service computing devices 103(1)-103(3) are added to the first service computing device 103(1), having the original role assigned, and mirrored to the second service computing device 103(2) and the third service computing device 103(3), having reflection roles assigned.

In the illustrated example, before mirroring is applied, the first service computing device 103(1) includes a plurality of file systems including a users' file system 302, an administrator file system 304, a marketing file system 306, a network share file system 308, a management file system 310, and a development file system 312. Furthermore, the second service computing device 103(2) includes the marketing file system 306 and the network share file system 308. In addition, the third service computing device 103 includes the users file system 302 and the administrator file system 304. Each of the above listed file systems 302-312 has a file system path listed on the first line and an associated file system ID (fsID) listed on the second line. Both the file system path and the file system ID may be unique or otherwise individually distinguishable within the computer system in which the file systems 302-312 are used, such as the system 100 discussed above with respect to FIG. 1. Each of the file systems 302-312 may correspond to a folder, which may be a team folder in some examples such that the corresponding file systems are not necessarily private to the user, but may be mounted under the user's private file system. The files systems/folders may also be referred to as a "share", which is a folder local to the service computing device 103 that may be represented as a team folder on the server, such as after a mapping PUT is performed. Mapping information for a share may include, e.g., an fsID and a path.

After mirroring is applied, the first service computing device 103(1) acts as the original service computing device, as indicated at 316, and the second service computing device 103(2) and the third service computing device 103(3) act as reflection computing devices, as indicated at 318 and 320 respectively. Each of the service computing devices 103 maintains a copy of the file systems 302-312. When the original service computing device 103(1) receives an update to one of the file systems 302-312, the update is propagated to the reflection service computing devices 103(2) and 103(3), as indicated by the arrows 322 and 324, respectively. Additionally, in some examples, the updates may be propagated between the second service computing device 103(2) and the third service computing device 103(3).

Figure 4:
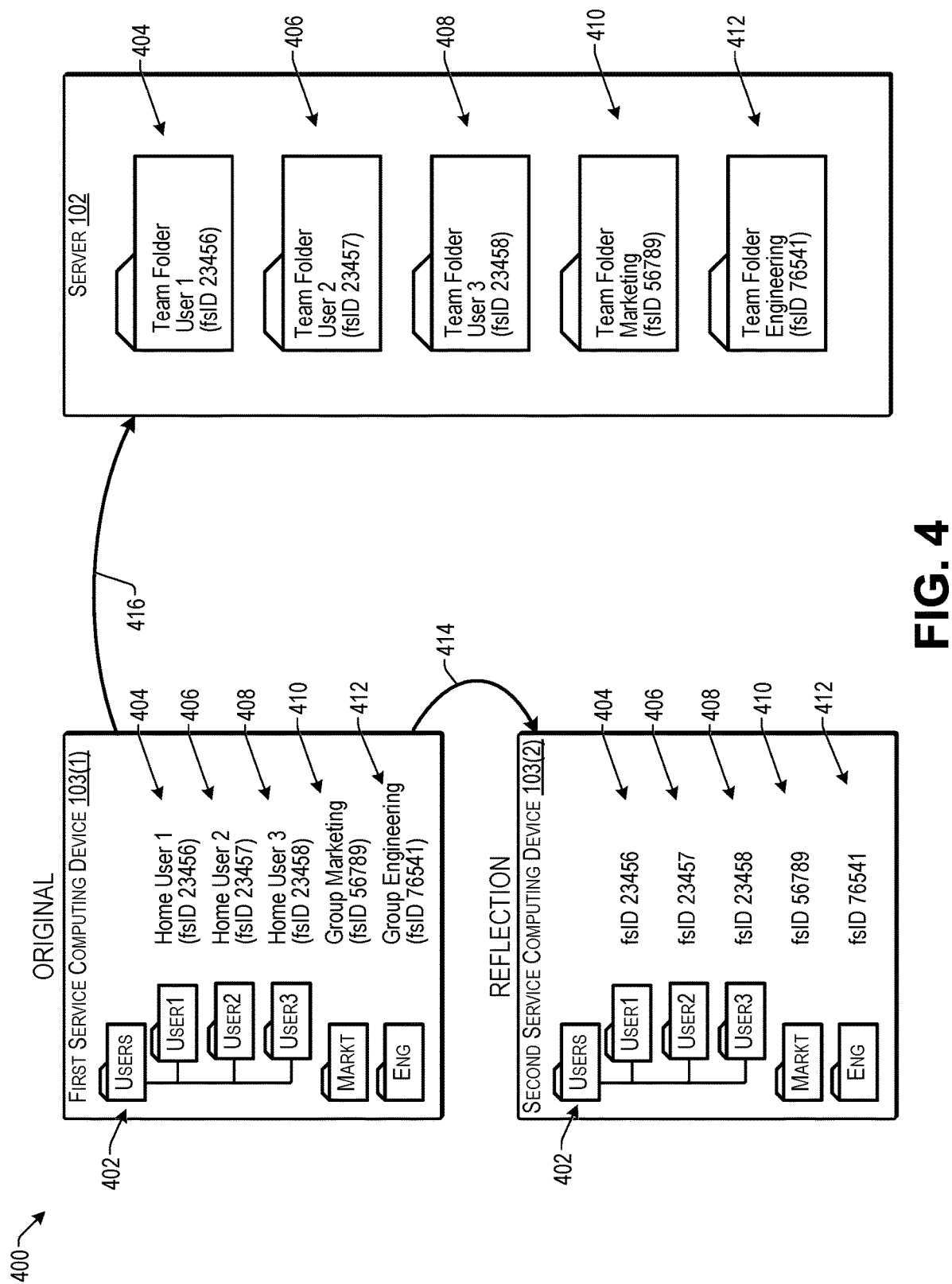
FIG. 4 is a block diagram illustrating a relationship between the original service computing device, the mirrored service computing device, and the server according to some implementations.

FIG. 4 is a block diagram 400 illustrating a relationship between the original service computing device, the mirrored service computing device, and the server according to some implementations. On the service computing devices 103 and the server 102, the folders belonging to each user, group, or team may each be organized into a separate file system. Metadata describing each file system may be stored in the service computing device metadata data bases and the server metadata database.

In this example, the first service computing device 103(1) is configured as the original service computing device and includes a user's folder 402 with a plurality of user subfolders including a user1 folder 404, a user2 folder 406, and a user3 folder 408. In addition, the first service computing device 103 includes a group marketing folder 410, and a group engineering folder 412. Each of the folders 404-412 includes an associated file system ID (fsID) that may be unique or otherwise individually distinguishable within the computer system such as the computer system 100 discussed above with respect to FIG. 1. As mentioned above, each folder may correspond to a separate file system in the computer system 100, and may also have a unique file system path (not shown in FIG. 4) as discussed above with respect to FIG. 3.

As updates to any of the folders 404-412 in the first service computing device 103(1) are received, the updates may be mirrored from the original service computing device 103(1) to the reflection service computing device 103(2), as indicated by arrow 414. In addition, the server 102 also maintains its version of the folders 402-412. As indicated by the arrow 416, updates to the folders 404-412 in the first service computing device 103 are also sent to the server 102 during normal operation.

Figure 5:
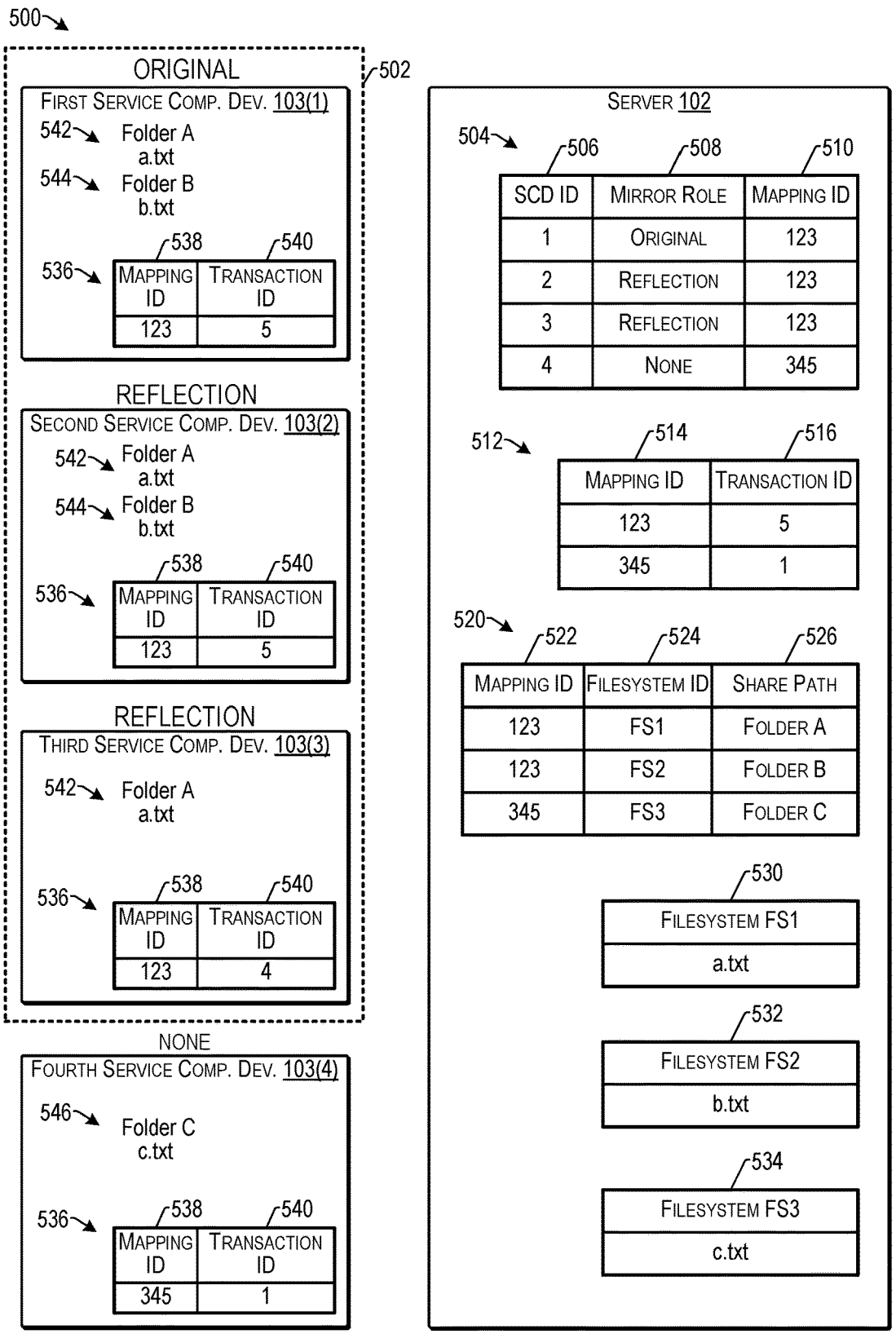
FIG. 5 is a block diagram illustrating an example of file system transaction mappings on an original service computing device, reflection service computing devices, and the server according to some implementations.

FIG. 5 is a block diagram 500 illustrating an example of file system transaction mappings on an original service computing device, reflection service computing devices, and the server according to some implementations. As illustrated in FIG. 5, a first service computing device 103(1), a second service computing device 103(2), and a third service computing device 103(3) are part of the same mirror set 502. In the mirror set 502, the first service computing device 103(1) is operating as the original device, and the second service computing device 103(2) and the third service computing device 103(3) are operating as reflection devices having content that is a reflection, i.e., a copy, of the file system metadata on the first service computing device 103(1). Furthermore, a fourth service computing device 103(4) is not part of the mirror set 502.

In this example, each service computing device 103(1)-103(3) that is part of the same mirror set 502 is assigned the same mapping identifier (ID). Having the same mapping ID indicates that each of these service computing devices 103(1)-103(3) may possibly provide information to the server 102 for recovery of the file systems associated with the original service computing device 103(1) and the mapping ID. In this example, the mapping ID for the service computing devices 103(1)-103(3) in the mirror set 502 is "123" while the mapping ID for the fourth service computing device 103(4) is "345". The mapping IDs may be assigned using any suitable procedure and may be unique or otherwise individually distinguishable within the system 100.

The server 102 may include a plurality of data structures for tracking the service computing devices 103 and the file systems maintained in thereon. In this example, the server 102 includes a mirror role and mapping data structure 504. The mirror role and mapping data structure 504 includes a service computing device (SCD) ID 506, a mirror role 508 of the identified service computing device and a mapping ID 510 of the identified service computing device. Accordingly, this data structure 504 indicates that the first second and third service computing devices 103(1)-103(3) have the same mapping ID 123, while the fourth service computing device 103(4) has a different mapping ID.

The server 102 further includes a transaction tracking data structure 512. The transaction tracking data structure includes mapping IDs 514 and corresponding transaction IDs 516. For example, for each time a transaction is performed with respect to the mapping of the file systems maintained by the first service computing device 103(1), i.e., the original device, the transaction ID is incremented. Examples of transactions may include add share, remove share, rename share. Additionally, the server 102 may include a folder tracking data structure 520 that includes a mapping ID 522, a file system ID 524, and a share path 526. For instance, the folder tracking data structure 520 indicates that folders A and B are managed by the service computing devices corresponding to the mapping ID 123, while folder C is managed by the service computing device corresponding to mapping ID 345.

Additionally, the server 102 includes data structures 530, 532, and 534 that identify files contained in each file system FS1, FS2, and FS3, respectively. For example, the data structure 530 indicates that file system FS1 includes the file a.txt; the data structure 532 indicates that the file system FS2 includes the file b.txt; and the data structure 534 indicates that the file system FS3 includes the file c.txt. In some examples, a version may be associated with each file so that the server is able to distinguish between files on the service computing device that have been updated and files that have not.

In addition, each of the service computing devices 103 may include a transaction ID data structure 536 that includes the mapping ID for the respective service computing device and the current transaction ID 540. In this example, the transaction ID in the first service computing device 103(1) and the second service computing device 103(2) is equal to "5", which is the same as the current count of the transaction ID 516 in the server data structure 512. For example, the first service computing device 103(1), the second service computing device 103(2), and the third service computing device 103(3) include the folder A, as indicated at 542, including the file a.txt. On the other hand, the first service computing device 103(1) and the second service computing device 103(2) also include folder B, as indicated at 544, including the file b.txt, but the third service computing device 103(3) does not include folder B and the file b.txt. Consequently, the transaction ID corresponding to "4" indicates that the folder B has not yet been reflected to the third service computing device 103. In addition, the fourth service computing device, which has a role of "none", includes a folder C having the file c.txt, as indicated at 546.

FIGS. 6-9 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

When a disaster, catastrophic breakdown, or other failure occurs, the server(s) 102 might be completely lost and new or repaired server(s) 102 may have to be restored from a backup. In this situation, the service computing devices 103 that were in sync with the server 102 before the recovery will be ahead of the server in processing transactions. In other words, the service computing devices 103 may have changes to the file systems that they manage that the server undergoing recovery has not incorporated. Therefore, the transaction IDs on the service computing devices 103 may be higher than the transaction IDs on the server 102. Consequently, if the service computing devices 103 were to directly update their states from the server 102, the local changes might be lost.

Figure 6:
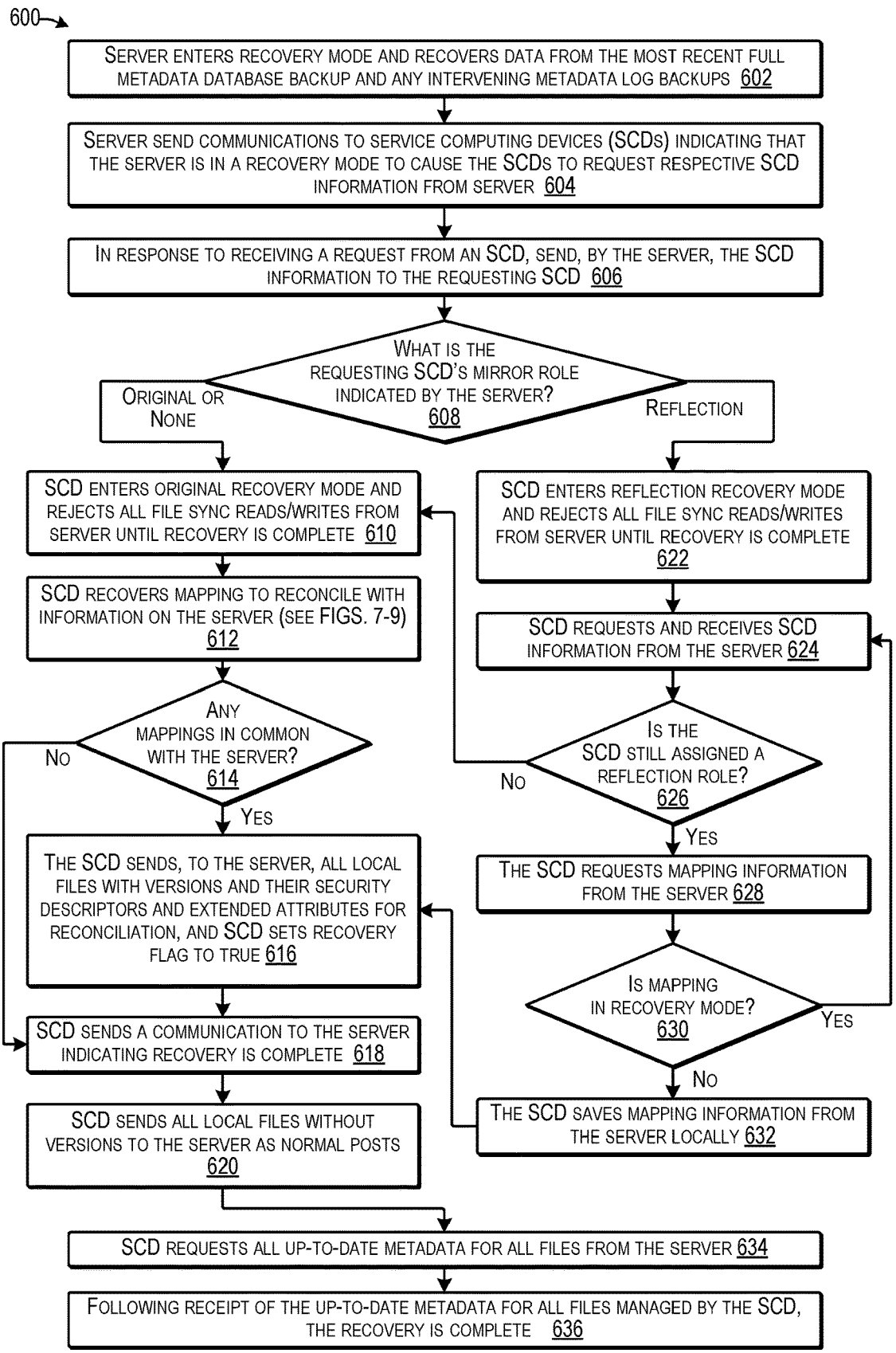
FIG. 6 is a flow diagram illustrating an example process for server recovery according to some implementations.

FIG. 6 is a flow diagram illustrating an example process 600 for server recovery according to some implementations. In some cases, the process 600 may be executed at least in part by the server 102 an in part by one or more service computing devices 103. In FIG. 6, suppose that a failure of the server occurred and the server is undergoing a recovery process to recover data and get back in synchronization with a plurality of the service computing devices 103 that are managed by the server 102. In brief, after a failure occurs on the server, the server recovers the file system metadata from the full metadata database backup maintained on the storage system 104 and from the metadata log backups also maintained on the storage system 104. After that, the server communicates with each original service computing device first to cause the original service computing devices to execute a recovery procedure utilizing information stored on each original service computing device, and may further check the information stored on the reflection devices to ensure that all of the transactions and other information are recovered by the server.

At 602, the server enters recovery mode and recovers data from the most recent full metadata database backup and any intervening metadata log backups. For example, an administrator may initiate recovery in some cases. In other cases, the recovery may be initiated by the server itself or by another computing device automatically.

At 604, the server may send communications to one or more of the service computing devices (SCDs), such as in response to receiving a request, or otherwise, indicating that the server is in a recovery mode, which may cause the SCDs to request respective SCD information from the server.

At 606, a respective SCD that requested the SCD information may receive, from the server, the SCD information. Examples of the SCD information received from the server may include the mirror role and mapping ID of the respective SCD, as discussed above with respect to data structure 504 of FIG. 5, the current transaction ID corresponding to the mapping ID of the respective SCD, as discussed above with respect to data structure 512 of FIG. 5, and the mapping information (e.g., mapping ID, file system ID, and share path) for the SCD, as discussed above with respect to data structure 520 of FIG. 5.

At 608, the SCD that receives the SCD information may determine its mirror role based on the mirror role indicated in the SCD information received from the server. If the mirror role is "original" or "none", the process goes to 610. On the other hand, if the mirror role is "reflection", the process goes to 622.

At 610, when the role is original or none, the SCD enters original recovery mode and rejects all file sync reads/writes from server until recovery is complete.

Figure 7:
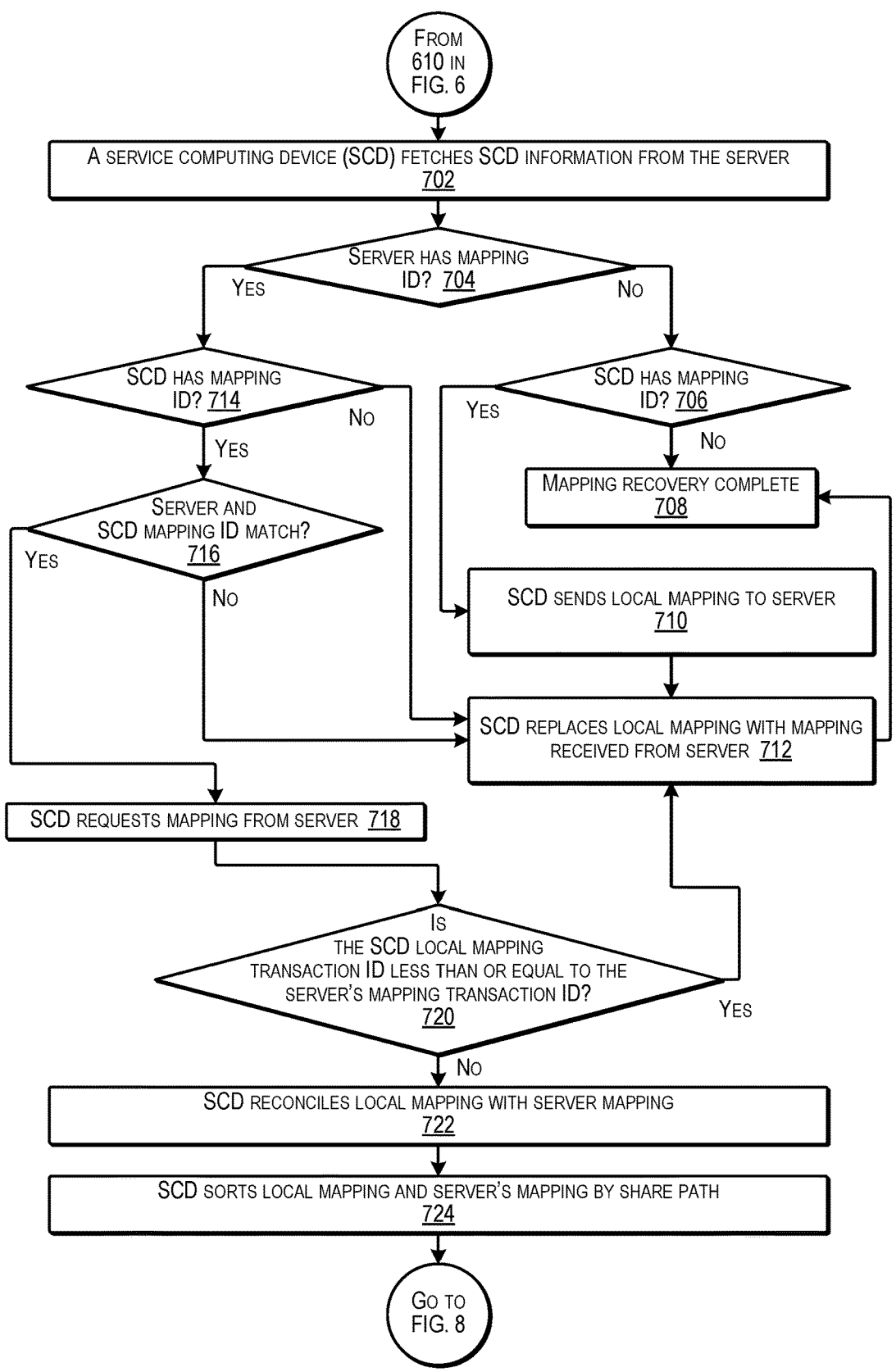
FIG. 7 is a flow diagram illustrating an example process for a service computing device to reconcile mapping with information on the server according to some implementations.
Figure 8:
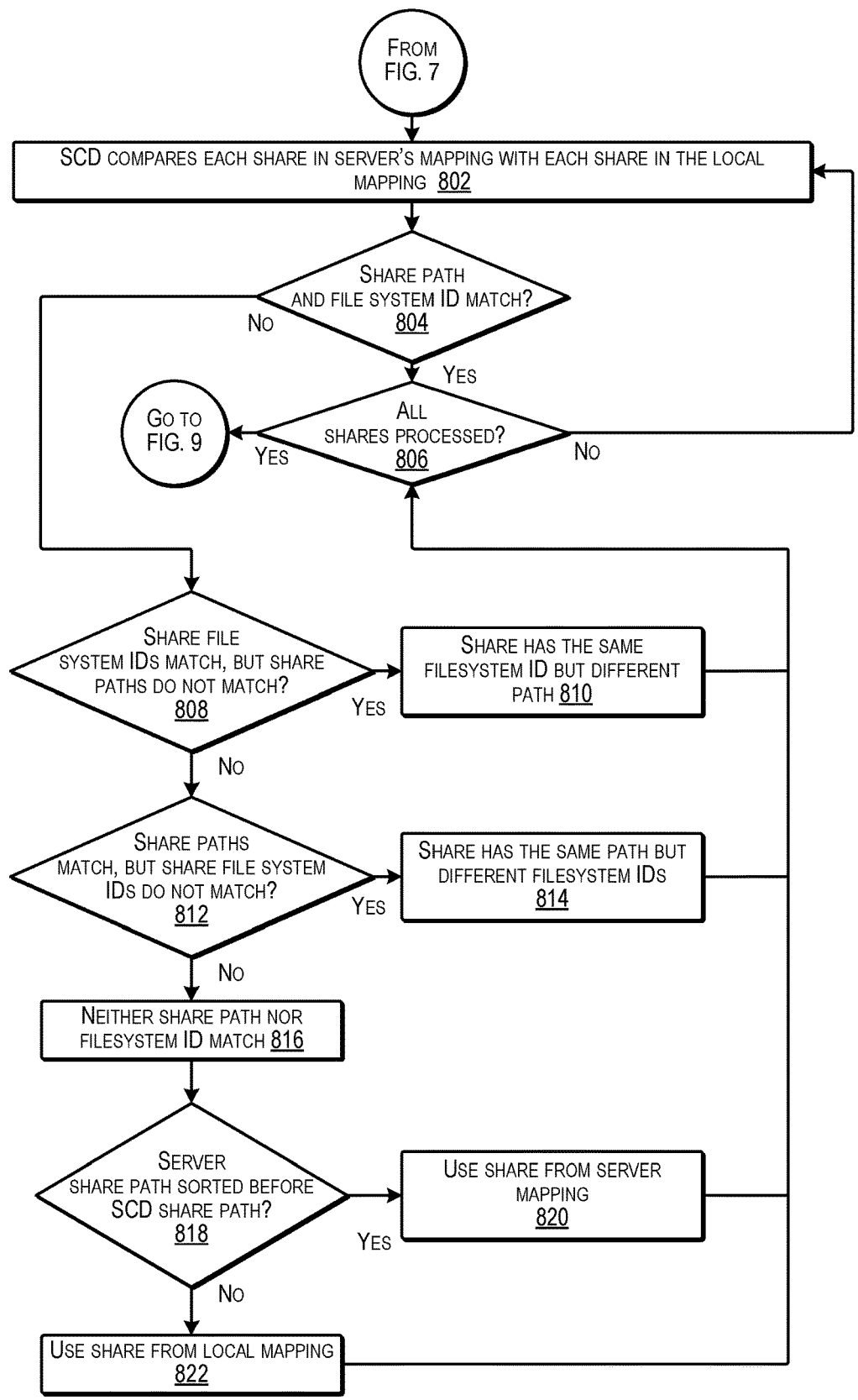
FIG. 8 is a flow diagram illustrating an example process that is a continuation of the example process of FIG. 7 according to some implementations.
Figure 9:
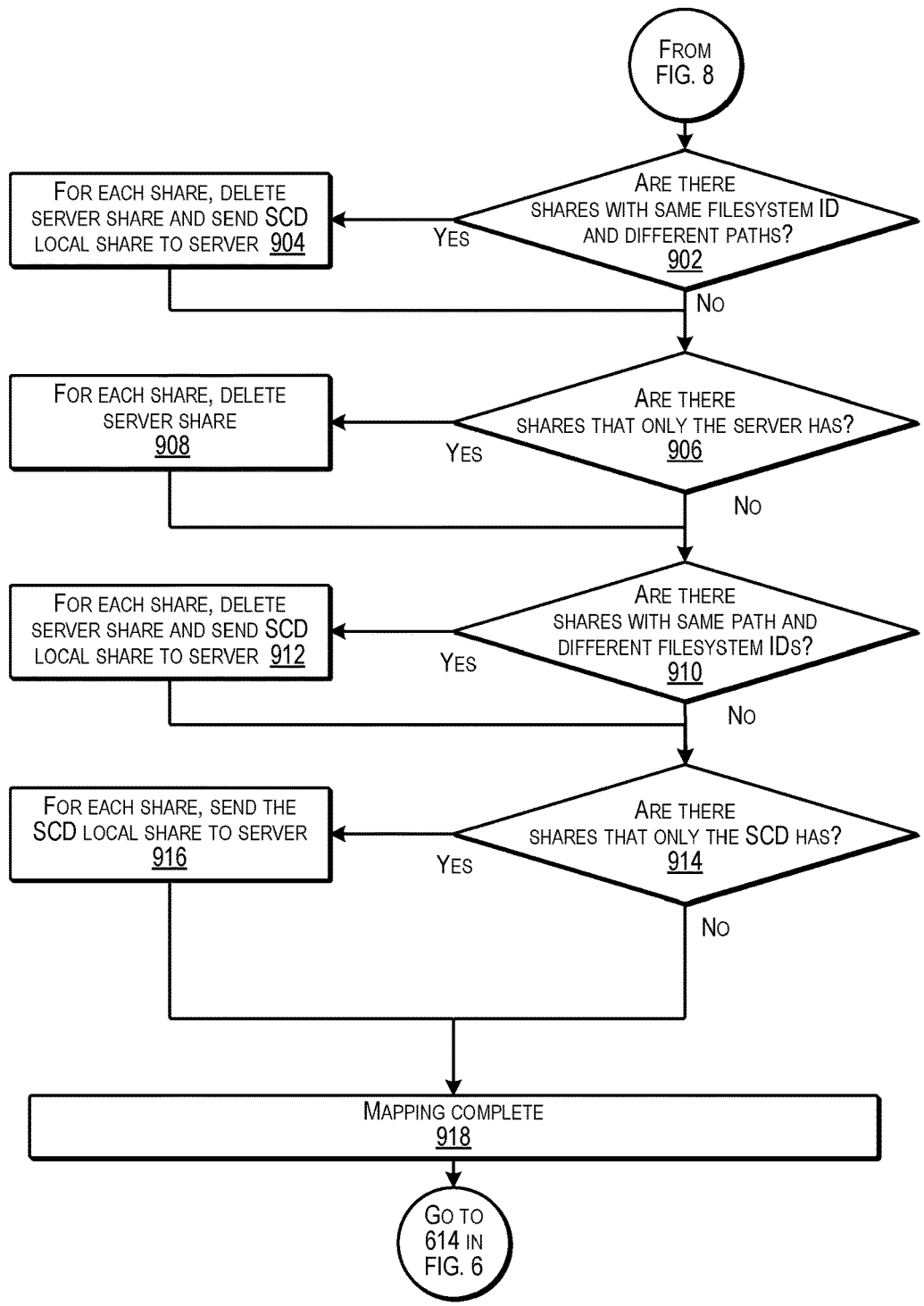
FIG. 9 is a flow diagram illustrating an example process that is a continuation of the example processes of FIG. 7 and FIG. 8 according to some implementations.

At 612, the SCD recovers mapping to reconcile with information on the server (see FIGS. 7-9 for details of this operation).

At 614, the SCD may determine any mappings in common with the server. If there are mappings in common, the process goes to 616. If not, the process goes to 618.

At 616, the SCD sends, to the server, all local files with versions, and their security descriptors and extended attributes for reconciliation, and the SCD sets a recovery indicator for each local file, such as to one of "PUT" or "UPDATE". For example, the SCD may traverse the entire local state and send all local items, such as files, folders, mount points, and the like, that have a version (e.g., were in sync at one point) to the server with an indication of whether or not the service computing device managing the file has local changes since the last time the service computing device was in sync with the server. As one non-limiting example, the sending of local items and synchronization process with the server may be performed as a REST API PUT which has information about filename, file path, hash and size of each file. The communication may also include contents of the file if the server has not already received the file content. The server may reconcile these PUTs with the existing state on the server. In some examples, security descriptors and extended attributes may be metadata related to files stored in the system. Security descriptors and extended attributes may be used to control user access to files and folders and special attributes (e.g., whether a file is hidden or not). For instance, the server and/or service computing devices may treat security descriptors and extended attributes as metadata, similar to treatment of path information, file hash, file size, etc. Therefore, when the SCD sends all of its files to the server for reconciliation, the SCD may also include this information.

At 618, the SCD sends a communication to the server indicating recovery is complete. Further, the SCD may exit the original recovery mode and may begin accepting file sync reads/writes from server.

At 620, the SCD sends all local files without versions to the server as normal posts.

At 622, on the other hand, when the SCD's mirror role is "reflection", rather than "original" or "none", the SCD enters reflection recovery mode and rejects all file sync reads/writes from server until recovery is complete.

At 624, the SCD requests and receives SCD information from the server. The requested SCD information may at least indicate the current mirror role of the requesting SCD.

At 626, the SCD determines whether it is still assigned a reflection role in the mirror set. If so, the process goes to 628. If not, the process goes to 610.

At 628, if the SCD is still assigned a reflection role, the SCD requests mapping information from the server.

At 630, the SCD may determine if the mapping is still in recovery mode. If so, the process returns to 624. If not, the process goes to 632.

At 632, if the mapping is not in recovery mode, the SCD saves the received mapping information from the server locally and goes to block 616.

At 634, following completion of 620, the SCD may request all up-to-date metadata for all files managed by the SCD from the server.

At 636, following receipt of the up-to-date metadata for all files managed by the SCD, the recovery is complete.

FIG. 7 is a flow diagram illustrating an example process 700 for a service computing device to recover mapping to reconcile with information on the server according to some implementations. In some cases, the process 700 may be executed at least in part by one or more service computing devices 103. Furthermore, in some examples, the process of FIGS. 7-9 may correspond to block 612 of FIG. 6.

At 702, the service computing device (SCD) receives SCD information from the server. As mentioned above with respect to FIGS. 6 and 5, the SCD information may include the mapping ID, if any, assigned to the requesting SCD.

At 704, the computing device may determine whether the server has a mapping ID for the SCD. If a mapping ID for the SCD does not exist on the server, the process goes to 706. If a mapping ID for the SCD does exist on the server, the process goes to 714.

At 706, the SCD determines whether the SCD has a local record of a mapping ID. If so, the process goes to 710. If not, the process goes to 708.

At 708, if neither the server, nor the SCD has a mapping ID for the SCD, the mapping recovery is complete.

At 710, if the server does not have a mapping ID for the SCD, but the SCD does have a mapping ID, then the SCD sends its own local mapping to the server. For instance, the SCD may generate a mapping PUT request with the shares and monitored paths from the SCD metadata database. In some examples, a "share" is a folder that is local to the SCD, such as may be represented as a team folder on the server after the mapping PUT is performed. For instance, in the example illustrated in FIG. 3 for the SCD 103(1), each folder 302-312 corresponds to a "share". After a mapping PUT is performed by the SCD, the server may assign each of those folders 302-312 an fsID. The SCD may then receive new mapping information for each share that is returned by the sever, including e.g., the fsID and path for each share, and saves this mapping information in its local metadata database as discussed below at 712.

At 712, the SCD replaces its own local mapping with a mapping received from the server. For example, in response to the PUT request at 710, the SCD may receive mapping information for database shares from the server, and may update the SCD's local metadata database based on the shares received from the server. Following 712, the process goes to 708, and the mapping recovery is compete.

At 714, if the server does have a mapping ID for the SCD, the SCD next determines whether the SCD has a local record of a mapping ID. If so, the process goes to 716. If not, the process goes to 712 to perform the operation discussed above.

At 716, the SCD determines whether the server mapping ID and the SCD mapping ID match each other. If so, the process goes to 718. If not, the process goes to 712. For example, if the mapping ID does exist on the server for this SCD, but the mapping ID on the server does not match what the SCD has recorded as its mapping ID, then an error may have occurred.

At 718, when the server mapping ID and the SCD mapping ID match each other, the SCD requests the share mappings from the server.

At 720, the SCD determines whether the SCD local mapping transaction ID is less than or equal to the server's mapping transaction ID. If so, the process goes to 712. If not, the process goes to 722.

At 722, when the SCD local mapping transaction ID is greater than the server's mapping transaction ID, this means that that SCD is ahead of the server and the mapping structure (e.g., as discussed above with respect to FIG. 3, item 316) may need to be reconciled.

At 724, the SCD sorts the local mapping and the server mapping by share path and the process goes to FIG. 8.

FIG. 8 is a flow diagram illustrating an example process 800 that is a continuation of the example process 700 of FIG. 7 according to some implementations. In some cases, the process 800 may be executed at least in part by one or more of the service computing devices 103. The process 800 continues following block 724 of FIG. 7 discussed above.

At 802, the SCD compares each share in server's mapping with each share in the local mapping. For example, the SCD may compare the SCD's local share path and fsID with the server's share path and fsID.

At 804, the computing device may determine whether the SCD's local share path and share file system ID match the server's share path and share file system ID. If so, the process goes to 806. If not, the process goes to 802 to compare the next server share with the SCD local shares.

At 806, the computing device may determine whether all shares have been processed. If so, the process goes to FIG. 9. If not, the process goes to 802 to compare the next server share with the SCD local shares.

At 808, the SCD determines whether the share file system IDs match, but the share paths do not match. If so, the process goes to 810. If not, the process goes to 812.

At 810, if the share file system IDs match, but the share paths do not match, the SCD determines that the share has the same file system ID, but a different share path, and goes to 806.

At 812, if the share path and file system ID do not match, the SCD determines whether the share paths match. If so, the process goes to 814. If not, the process goes to 816.

At 814, the SCD determines that the share has the same path, but different file system IDs, and goes to 806.

At 816, the SCD determines that neither share path nor file system ID match.

At 818, if the share paths and file system IDs do not match, the SCD determines whether the server share path was sorted before SCD share path. If so, the process goes to 820. If not, the process goes to 822.

At 820, the SCD uses the share from the server mapping and goes to 806.

At 822, the SCD uses the share from the local mapping and goes to 806.

FIG. 9 is a flow diagram illustrating an example process 900 that is a continuation of the example processes 700 of FIG. 7 and 800 of FIG. 8 according to some implementations. In some cases, the process 900 may be executed at least in part by one or more service computing devices 103. The process 900 continues following block 806 of FIG. 8 discussed above.

At 902, the SCD determines whether there are shares with the same file system ID and different share paths. If so, the process goes to 904. If not, the process goes to 906.

At 904, for each file system share, the SCD deletes the server share and sends the SCD local share to the server.

At 906, the SCD determines whether there are shares that only the server has. If so, the process goes to 908. If not, the process goes to 910.

At 908, for each share that only the server has, the SCD deletes the server share.

At 910, the SCD determines whether there are shares with the same share path and different file system IDs. If so, the process goes to 912. If not, the process goes to 914.

At 912, for each share, the SCD deletes the server share and sends the SCD local share to the server.

At 914, the SCD determines whether there are shares that only the SCD has. If so, the process goes to 916. If not, the process goes to 918.

At 916, for each share, the SCD sends the SCD local share to the server.

At 918, the SCD determines that the mapping procedure is complete and proceeds with block 614 of FIG. 6.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 10:
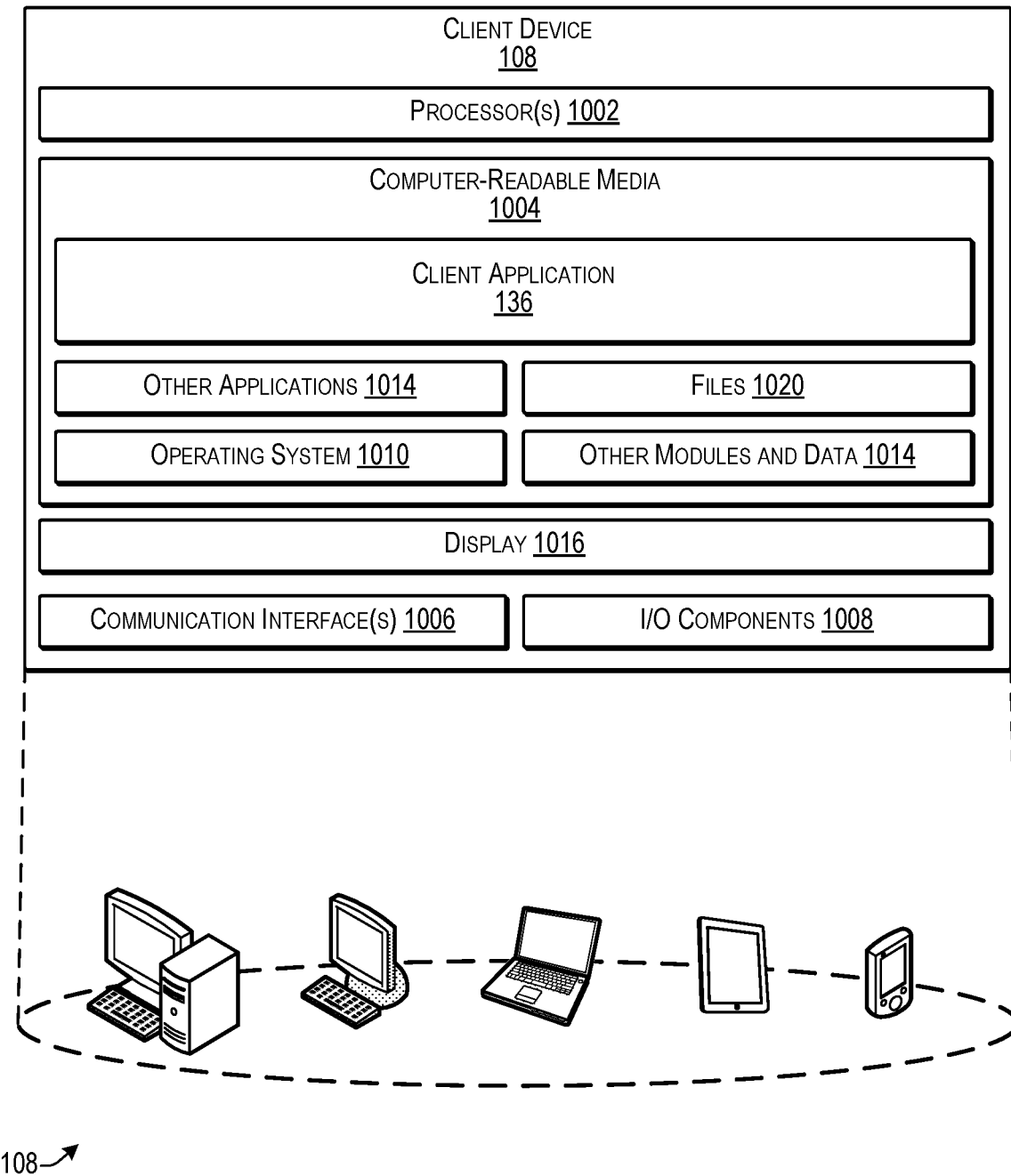
FIG. 10 illustrates an example configuration of a client device according to some implementations.

FIG. 10 illustrates select example components of an example client device 108 according to some implementations. Each client device 108 may be any suitable type of computing device such as a workstation, desktop, laptop, tablet computing device, mobile device, smart phone, wearable computing device, or any other type of computing device able to send and receive data over a network. Furthermore, the client devices 108 may be able to communicate with the one or more servers 102 through the one or more networks 106, through separate networks, or through any other suitable type of communication connection (not shown in FIG. 10). Numerous other variations may be apparent to those of skill in the art having the benefit of the disclosure herein.

In a basic configuration, the client device 108 includes components such as at least one processor 1002, one or more computer-readable media 1004, one or more communication interfaces 1006, and one or more input/output (I/O) components 1008. Each processor 1002 may itself comprise one or more processors or processing cores. For example, each processor 1002 may be implemented as one or more microprocessors, microcomputers, microcontrollers, digital signal processors, central processing units, state machines, logic circuitries, and/or any devices that manipulate signals based on operational instructions. In some cases, the processor 1002 may include one or more hardware processors and/or logic circuits of any suitable type specifically programmed or configured to execute the processes and other algorithms described herein. The processor 1002 may be configured to fetch and execute computer-readable processor-executable instructions stored in the computer-readable media 1004.

Depending on the configuration of the client device 108, the computer-readable media 1004 may be an example of tangible non-transitory computer-readable media and may include volatile and nonvolatile memory and/or removable and non-removable media implemented in any type of technology for storage of information such as computer-readable processor-executable instructions, data structures, program modules, or other data. The computer-readable media 1004 may include, but is not limited to, RAM, ROM, EEPROM, flash memory, solid-state storage, optical storage, magnetic disk storage, magnetic tape, and/or other types of storage technology. Further, in some cases, the client device 108 may access external storage, such as directly, through another computing device, or through a network. Accordingly, the computer-readable media 1004 may be computer storage media able to store instructions, programs, or software code that may be executed by the processor 1002.

The computer-readable media 1004 may be used to store and maintain any number of functional components that are executable by the processor 1002. In some implementations, these functional components comprise instructions or programs that are executable by the processor 1002 and that, when executed, implement operational logic for performing the actions and services attributed above to the client devices 108. Functional components of the client device 108 stored in the computer-readable media 1004 may include the client application 136, as discussed above. Additional functional components may include an operating system 1010 for controlling and managing various functions of the client device 108 and for enabling basic user interactions with the client device 108. The computer-readable media 1004 may further include one or more other applications 1014 that may be executed on the client devices 108 for performing various functions and tasks, which may include a browser application. Additionally, or alternatively, in some cases, the client application 136 may be or may include a browser.

In addition, the computer-readable media 1004 may also store data, data structures and the like, that are used by the functional components. For example, data and data structures stored by the computer-readable media 1004 may include one or more files 1012 and/or other data objects. Depending on the type of the client device 108, the computer-readable media 1004 may also optionally include other functional components and data, such as other modules and data 1014, which may include programs, drivers, etc., and the data used or generated by the functional components.

The client device 108 may further include the one or more communication interfaces 1006. The communication interface(s) 1006 may include one or more interfaces and hardware components for enabling communication with various other devices, such as over the network(s) 106. For example, the communication interfaces 1006 may include, or may couple to, one or more ports that provide connection to the network(s) 106 for communication with the servers 102 or other computing devices. For example, the communication interface(s) 1006 may enable communication through one or more of a LAN (local area network), WAN (wide area network), the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The client device 108 may further include the I/O components 1008, such as speakers, a microphone, a camera, and various user controls (e.g., buttons, a joystick, a keyboard, a keypad, a touch screen, etc.), a haptic output device, and so forth. For example, the operating system 1010 of the client device 108 may include suitable drivers configured to accept input from a keypad, keyboard, or other user controls and devices included with the I/O components 1008. In addition, the client device 108 may include a display 1016, which may be passive, emissive or any other form of display. Additionally, the client device 108 may include various other components that are not shown, examples of which include various types of sensors, a Global Positioning System device, a power source, such as a battery and power control unit, and so forth. Furthermore, in some examples, the administrator computing device 162 may have a hardware configuration similar the client devices 108, but with different functional components, as discussed above.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a first computing device including one or more processors configured by executable instructions to perform operations comprising:
receiving, by the first computing device, from a server, an indication that the server has recovered backed up metadata to a server metadata database maintained by the server, wherein the first computing device stores, in a first metadata database, metadata including a file system mapping for one or more file systems accessed by one or more client devices via the first computing device, wherein a second computing device is configured to store, to a second metadata database, a copy of the file system mapping stored by the first computing device;
based on the server having performed recovery of the backed up metadata to the server metadata database, receiving, by the first computing device, from the server, a recovered file system mapping of the one or more file systems determined by the server from the backed up metadata recovered by the server;
in response to receiving from the server the recovered file system mapping determined from the recovered backed up metadata, comparing, by the first computing device, the recovered file system mapping received from the server with the file system mapping of the one or more file systems stored by the first computing device in the first metadata database, wherein the comparing by the first computing device comprises comparing each share path and file system identifier in the recovered file system mapping from the server with each share path and file system identifier in the file system mapping on the first computing device; and
sending, by the first computing device, to the server, information about changes determined between the file system mapping stored by the first computing device and the recovered file system mapping received from the server to enable the server to update the recovered file system mapping in the server metadata database based on the information about the changes determined between the file system mapping stored by the first computing device and the recovered file system mapping received from the server.

2. The system as recited in claim 1, the operations further comprising sending, to the server, one or more files stored locally on the first computing device with an indication to one of: update an existing file or store as a new file.

3. The system as recited in claim 1, further comprising:
receiving, by the first computing device, from the server, a mapping identifier (ID) indicating a mirror set including the first computing device and the second computing device;
comparing the mapping ID received from the server with a mapping ID on the first computing device; and
based on determining that the mapping ID received from the server matches the mapping ID on the first computing device, requesting, by the first computing device, the recovered file system mapping of the one or more file systems determined by the server from the backed up metadata recovered by the server to the server metadata database.

4. The system as recited in claim 1, wherein:
based at least on the server recovering the backed up metadata to the server metadata database, the second computing device receives, from the server, an indication that a role of the second computing device is to store, in the second metadata database, a copy of the file system mapping stored by the first computing device in the first metadata database; and
based on determining that the server has completed recovering data, the second computing device receives, from the server, updated file system mapping information determined based at least in part on the information about the changes sent to the server by the first computing device.

5. The system as recited in claim 1, wherein:
based at least on the server recovering the backed up metadata to the server metadata database, the second computing device receives, from the server, an indication that a role of the second computing device has changed to a role of the first computing device;
receiving, by the second computing device, from the server, the recovered file system mapping of the one or more file systems; and
comparing, by the second computing device, the recovered file system mapping from the server with the file system mapping of the one or more file systems on the second computing device.

6. The system as recited in claim 1, the operations further comprising, prior to receiving the indication that the server has recovered data, receiving, by the first computing device, from the server, an instruction to cause the first server to at least one of:
replicate the one or more file systems to the second computing device; or
replicate updates to the one or more file systems to the second computing device.

7. The system as recited in claim 6, wherein the first computing device and the second computing device are assigned a same mapping identifier based on the second computing device being configured to store, in the second metadata database, the copy of the file system mapping stored by the first computing device in the first metadata database, the mapping identifier corresponding to the file system mapping stored by the first computing device.

8. The system as recited in claim 1, the operations further comprising:
receiving, by the first service computing device, from the server, a transaction identifier (ID) that indicates a last transaction processed according to the recovered file system mapping from the server;
comparing the transaction ID received from the server with a transaction ID on the first computing device; and
based on the transaction ID on the first computing device being greater than the transaction ID from the server, comparing, by the first computing device, the recovered file system mapping from the server with the file system mapping of the one or more file systems on the first computing device.

9. The system as recited in claim 1, further comprising sending, to the server, a local share on the first computing device having a share file system identifier that is the same as a server share file system identifier and a different share path from a server share path.

10. The system as recited in claim 1, further comprising sending, to the server, a local share on the first computing device having a share path that is the same as a server share path and a different share file system identifier from a server share file system identifier.

11. The system as recited in claim 1, wherein the first computing device is configured to communicate with at least one of the client computing devices for sending client data to the at least one client computing device and receiving client data from the at least one client computing device, wherein the client data is stored based on at least one of the file systems.

12. The system as recited in claim 1, the operations further comprising:
prior to sending to the server the information about the changes determined between the file system mapping stored by the first computing device and the recovered file system mapping received from the server, receiving, by the first computing device, from the server, a request to synchronize at least one of a file read or a file write; and
disregarding, by the first computing device, the request based on determining that recovery of the server metadata database by the server is incomplete.

13. A method comprising:
receiving, by one or more processors of a first computing device, from a server, an indication that the server has recovered backed up metadata to a server metadata database maintained by the server, wherein the first computing device stores, in a first metadata database, first metadata including a file system mapping for one or more file systems accessed by one or more client devices via the first computing device, wherein a second computing device is configured to store, to a second metadata database, a copy of the file system mapping stored by the first computing device;
based on the server having performed recovery of the backed up metadata to the server metadata database, receiving, by the first computing device, from the server, a recovered file system mapping of the one or more file systems determined by the server from the backed up metadata recovered by the server;
in response to receiving from the server the recovered file system mapping determined from the recovered backed up metadata, comparing, by the first computing device, the recovered file system mapping received from the server with the file system mapping of the one or more file systems stored by the first computing device in the first metadata database, wherein the comparing by the first computing device comprises comparing each share path and file system identifier in the recovered file system mapping from the server with each share path and file system identifier in the file system mapping on the first computing device; and
sending, by the first computing device, to the server, information about changes determined between the file system mapping stored by the first computing device and the recovered file system mapping received from the server to enable the server to update the recovered file system mapping in the server metadata database based on the information about the changes determined between the file system mapping stored by the first computing device and the recovered file system mapping received from the server.

14. The method as recited in claim 13, further comprising:
receiving, by the first computing device, from the server, a mapping identifier (ID) indicating a mirror set including the first computing device and the second computing device;
comparing the mapping ID received from the server with a mapping ID on the first computing device; and
based on determining that the mapping ID received from the server matches the mapping ID on the first computing device, requesting, by the first computing device, the recovered file system mapping of the one or more file systems determined by the server from the backed up metadata recovered by the server to the server metadata database.

15. The method as recited in claim 13, wherein:
based at least on the server recovering the backed up metadata to the server metadata database, the second computing device receives, from the server, an indication that a role of the second computing device is to store, in the second metadata database, a copy of the file system mapping stored by the first computing device in the first metadata database; and
based on determining that the server has completed recovering data, the second computing device receives, from the server, updated file system mapping information determined based at least in part on the information about the changes sent to the server by the first computing device.

16. The method as recited in claim 13, wherein:
based at least on the server recovering the backed up metadata to the server metadata database, the second computing device receives, from the server, an indication that a role of the second computing device has changed to a role of the first computing device;
receiving, by the second computing device, from the server, the recovered file system mapping of the one or more file systems; and
comparing, by the second computing device, the recovered file system mapping from the server with the file system mapping of the one or more file systems on the second computing device.

17. One or more non-transitory computer-readable media storing instructions that, when executed by one or more processors of a first computing device, program the one or more processors to perform operations comprising:
receiving, by the first computing device, from a server, an indication that the server has recovered backed up metadata to a server metadata database maintained by the server, wherein the first computing device stores, in a first metadata database, first metadata including a file system mapping for one or more file systems accessed by one or more client devices via the first computing device, wherein a second computing device is configured to store, to a second metadata database, a copy of the file system mapping stored by the first computing device;
based on the server having performed recovery of the backed up metadata to the server metadata database, receiving, by the first computing device, from the server, a recovered file system mapping of the one or more file systems determined by the server from the backed up metadata recovered by the server;

in response to receiving from the server the recovered file system mapping determined from the recovered backed up metadata, comparing, by the first computing device, the recovered file system mapping received from the server with the file system mapping of the one or more file systems stored by the first computing device in the first metadata database, wherein the comparing by the first computing device comprises comparing each share path and file system identifier in the recovered file system mapping from the server with each share path and file system identifier in the file system mapping on the first computing device; and sending, by the first computing device, to the server, information about changes determined between the file system mapping stored on the first computing device and the recovered file system mapping received from the server to enable the server to update the recovered file system mapping in the server metadata database based on the information about the changes determined between the file system mapping stored by the first computing device and the recovered file system mapping received from the server.

18. The one or more non-transitory computer-readable media as recited in claim 17, the operations further comprising:

receiving, by the first computing device, from the server, a mapping identifier (ID) indicating a mirror set including the first computing device and the second computing device;

comparing the mapping ID received from the server with a mapping ID on the first computing device; and based on determining that the mapping ID received from the server matches the mapping ID on the first computing device, requesting, by the first computing device, the recovered file system mapping of the one or more file systems determined by the server from the backed up metadata recovered by the server to the server metadata database.

19. The one or more non-transitory computer-readable media as recited in claim 17, wherein:

based at least on the server recovering the backed up metadata to the server metadata database, the second computing device receives, from the server, an indication that a role of the second computing device is to store, in the second metadata database, a copy of the file system mapping stored by the first computing device in the first metadata database; and based on determining that the server has completed recovering data, the second computing device receives, from the server, updated file system mapping information determined based at least in part on the information about the changes sent to the server by the first computing device.

* * * * *